US012651121B2

(12) United States Patent
Manandise et al.

(10) Patent No.: US 12,651,121 B2
(45) Date of Patent: Jun. 9, 2026

(54) LARGE LANGUAGE MODEL-BASED METHOD FOR TRANSLATING A PROMPT INTO A PLANNING PROBLEM

(71) Applicant: Intuit, Inc., Mountain View, CA (US)

(72) Inventors: Esmé Manandise, Tallahassee, FL (US); Anu Sreepathy, Sunnyvale, CA (US); Sudhir Agarwal, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 168 days.

(21) Appl. No.: 18/495,641

(22) Filed: Oct. 26, 2023

(65) Prior Publication Data

US 2025/0139367 A1 May 1, 2025

(51) Int. Cl.
*G06F 40/284* (2020.01)
*G06F 40/211* (2020.01)
*G06F 40/226* (2020.01)

(52) U.S. Cl.
CPC .......... *G06F 40/284* (2020.01); *G06F 40/211* (2020.01); *G06F 40/226* (2020.01)

(58) Field of Classification Search
CPC .... G06F 40/284; G06F 40/211; G06F 40/226; G06F 40/30
See application file for complete search history.

(56) References Cited

U.S. PATENT DOCUMENTS

| | | | |
|---|---|---|---|
| 2016/0364377 A1* | 12/2016 | Krishnamurthy | ....... G06F 40/35 |
| 2024/0095077 A1* | 3/2024 | Singh | .................... G06F 9/5027 |
| 2025/0005318 A1* | 1/2025 | Dvorak | ................. G06N 3/045 |

OTHER PUBLICATIONS

Xie, Yaqi, et al. Translating Natural Language to Planning Goals with Large-Language Models. arxiv.org/pdf/2302.05128.pdf.
Liu, Bo, et al. LLM+P: Empowering Large Language Models with Optimal Planning Proficiency. arxiv.org/pdf/2304.11477.pdf.
Silver, Tom, et al. Generalized Planning in PDDL Domains with Pretrained Large Language Models. arxiv.org/pdf/2305.11014.pdf.

* cited by examiner

*Primary Examiner* — Daniel C Washburn
*Assistant Examiner* — Paul J. Mueller
(74) *Attorney, Agent, or Firm* — Dinsmore & Shohl LLP

(57) ABSTRACT
Certain aspects of the disclosure provide techniques for translating a prompt into a structured input to resolve the natural langue query as a planning problem. A method generally includes identifying and classifying tokens in a prompt using a large language model (LLM); extracting from a domain description in a planning domain definition language (PDDL): object types used to categorize objects; and predicates identifying relationships between the objects that may be true or false; categorizing at least one token in the prompt as one or more of the objects, one or more of the object types, or one or more of the predicates based on the classification of the at least one token determined by the LLM; and generating a task description in the PDDL based on the categorization, the task description comprising a translation of the prompt into a structured input for a planner.

14 Claims, 5 Drawing Sheets

400

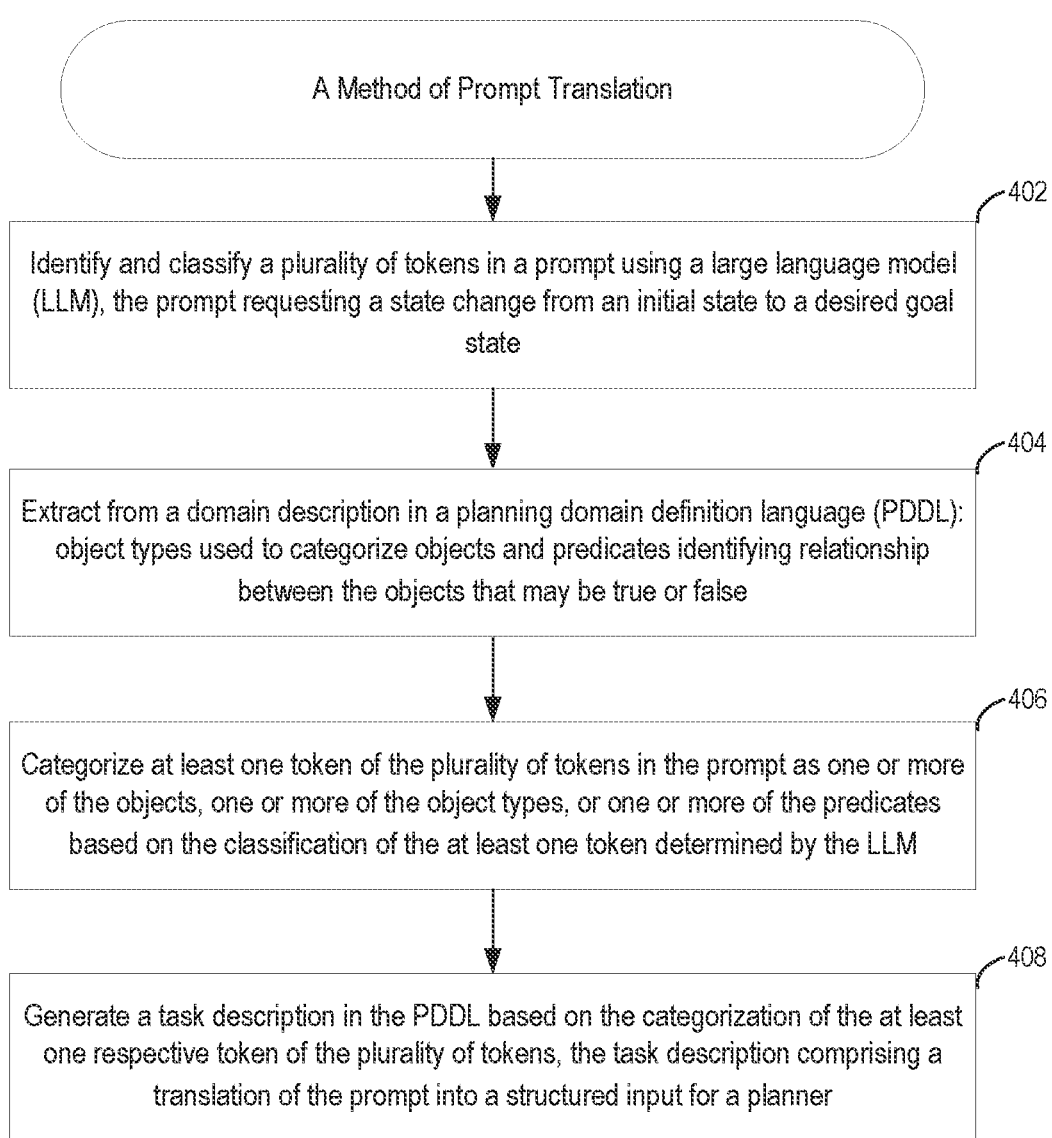

A Method of Prompt Translation

402

Identify and classify a plurality of tokens in a prompt using a large language model (LLM), the prompt requesting a state change from an initial state to a desired goal state

404

Extract from a domain description in a planning domain definition language (PDDL): object types used to categorize objects and predicates identifying relationship between the objects that may be true or false

406

Categorize at least one token of the plurality of tokens in the prompt as one or more of the objects, one or more of the object types, or one or more of the predicates based on the classification of the at least one token determined by the LLM

408

Generate a task description in the PDDL based on the categorization of the at least one respective token of the plurality of tokens, the task description comprising a translation of the prompt into a structured input for a planner

FIG. 4

LARGE LANGUAGE MODEL-BASED METHOD FOR TRANSLATING A PROMPT INTO A PLANNING PROBLEM

BACKGROUND

Field

Aspects of the present disclosure relate to techniques for translating a prompt (e.g., posed in natural language) into a structured input to resolve the prompt as a planning problem.

Description of Related Art

A prompt is a specific instruction and/or request, posed in natural language, given to a computer program and/or language model to perform a particular task and/or generate a specific output. In other words, a prompt is input (e.g., a question, a query, a command, etc.) that consists of terms or phrases spoken normally and/or entered as they might be spoken, without any special format and/or alteration of syntax. In some cases, prompts are generated through a text and/or voice interface.

In the context of natural language processing (NLP) and machine learning, prompts are often used to guide large language models (LLMs) in generating output, such as text. In particular, an LLM is a type of machine learning model that can perform a variety of NLP tasks, such as generating and classifying text, answering prompts in a conversational manner, and translating text from one language to another. NLP makes it possible for software to "understand" typical human speech or written content as an input into an LLM-based system and to respond to it by, in some cases, generating human-understandable responses through natural language generation (NLG).

A popular LLM, which has gained much recent attention, is "ChatGPT," produced by OpenAI®. Generative pre-trained transformer (GPT) models, such as ChatGPT, are a specific type of LLM based on a transformer architecture (e.g., architecture that uses an encoder-decoder structure and does not rely on recurrence and/or convolutions to generate an output), pre-trained in a generative and unsupervised manner (e.g., it learns from data without being given explicit instructions on what to learn). GPT models analyze prompts and predict the best possible response based on their understanding of the language. In particular, the GPT models rely on the knowledge they gain after their, in some cases, billions or even trillions of parameters, are trained on massive datasets.

While LLMs, such as ChatGPT, represent a transformative force in many industries by enabling developers to build conversation-driven applications for prompt processing and answering, these models are not without limitation. For example, while a powerful tool, a general-purpose LLM is only as good as the underlying, publicly-available training data used to train the model. This presents a technical problem in cases where the knowledge artifacts necessary for accurately responding to a prompt are partly, or completely, internal to an organization. For example, a general-purpose LLM trained on publicly-available data, while vast, may not be able to respond, or may respond incorrectly, to a prompt requesting information about employee retention at a particular company for a previous year, given that this information is internal and confidential to the company (e.g., not publicly available, and thus not used to train the LLM).

SUMMARY

Certain aspects provide a method of prompt translation. The method generally includes identifying and classifying a plurality of tokens in a prompt using a large language model (LLM), the prompt requesting a state change from an initial state to a desired goal state; extracting from a domain description in a planning domain definition language (PDDL): object types used to categorize objects; and predicates identifying relationships between the objects that may be true or false; categorizing at least one token of the plurality of tokens in the prompt as one or more of the objects, one or more of the object types, or one or more of the predicates based on the classification of the at least one token determined by the LLM; and generating a task description in the PDDL based on the categorization of the at least one token of the plurality of tokens, the task description comprising a translation of the prompt into a structured input for a planner.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts an example method for prompt translation.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
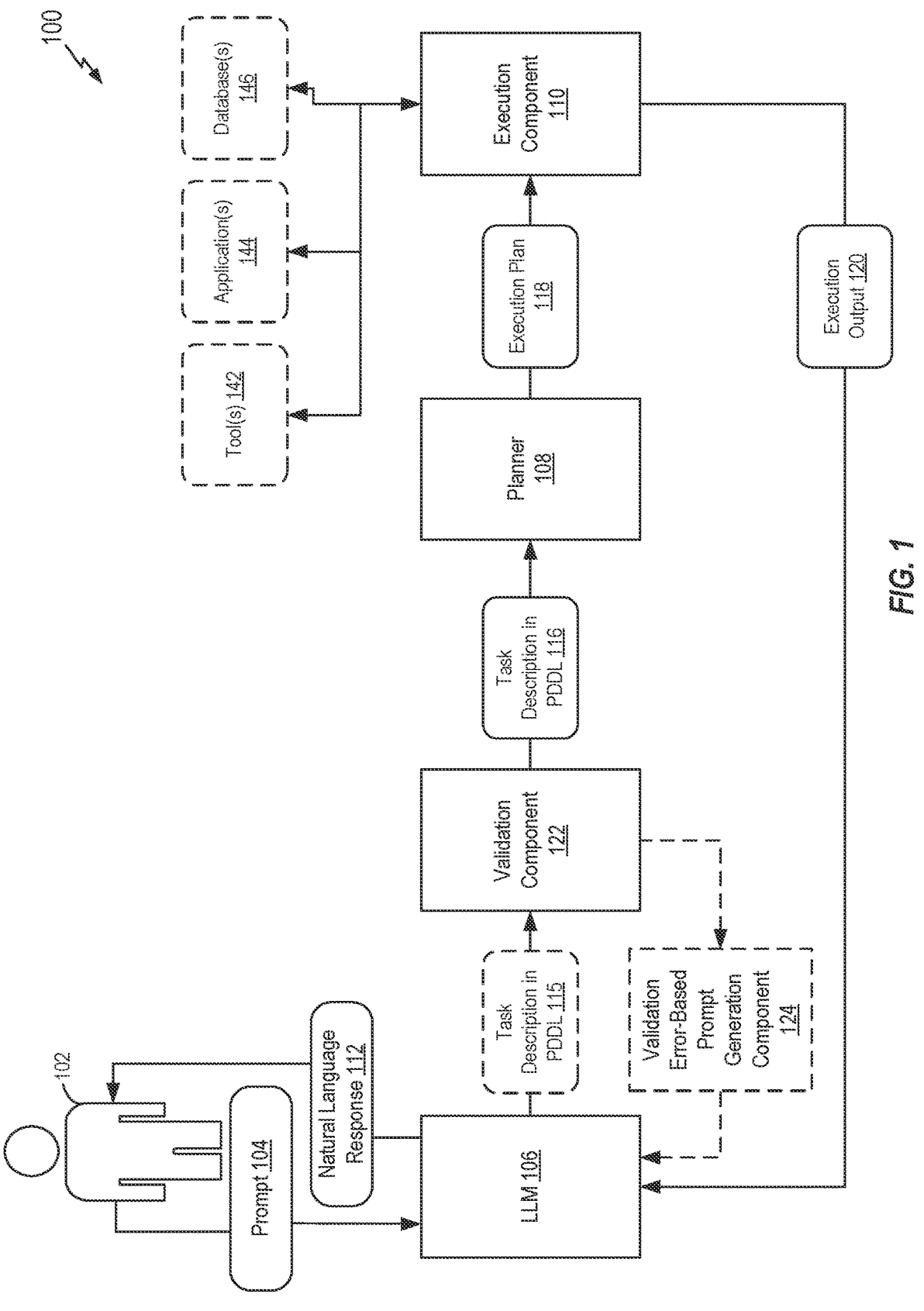
FIG. 1 depicts an example system for processing and answering prompts as planning problems.

To address the shortcomings of general-purpose LLMs, some conventional approaches seek to combine and orchestrate LLM functionality with other sources of computation and/or knowledge. For example, some conventional approaches focus on using an LLM as a planner, by interfacing LLMs with organization-specific application programming interface(s) (API(s)) (e.g., mechanisms that enable at least two software components to communicate with each other using a set of definitions and protocols) and/or other tool(s). For instance, the LLM, acting as a planner, may be configured to perform similar functions as a planner used to solve classical artificial intelligence (AI)

planning (also referred to as "classical planning" or simply "planning") problems. Specifically, classical AI planning is the problem of finding a sequence of actions, e.g., an "execution plan" or simply a "plan," for achieving a goal state from an initial state assuming that actions have deterministic effects.

For example, a prompt received by a planner may be (1) an information-seeking prompt requesting a state change from an initial state to a desired goal state, based on information retrieval of general and/or domain-specific data (e.g., desired goal state is the possession of information), (2) a task-oriented prompt requesting a state change from an initial state to a desired goal state, based on the completion of one or more tasks excluding information retrieval, or (3) a combination of both (e.g., requesting information retrieval and the performance of one or more other tasks). An information-seeking prompt may be a prompt requesting information about an organization's sales for the past month (e.g., "Please provide Organization X's sales for January 2023"), a prompt requesting information about employee turnover statistics for an organization, a prompt requesting information about potential areas for organization development, and/or the like. On the other hand, task-oriented prompts may include prompts requesting to perform one or more tasks, such as sending an email (e.g., "Send an event email to JaneDoe@gmail.com"), publishing a document, drafting an invoice and sending the invoice to a client, and/or the like. Further, an example information-seeking and task-oriented prompt may be "Send customer Jane Doe the invoice for 5 cakes for $125 on Sep. 30, 2023," given that information about Jane Doe, her email, the cake, etc. need to be retrieved prior to performing other tasks (e.g., generating the invoice, sending the email, etc.) to reach the goal state.

LLMs as planners, used to solve classical AI planning problems, are responsible for (1) identifying a sequence of actions to reach a desired goal state indicated by an information-seeking and/or task-oriented prompt and (2) orchestrating the execution of those actions. Specifically, by integrating an LLM with organization-specific API(s) and/or tool(s) such that the LLM is able to act as a planner, organizations can create a system where users of the organization can generate prompts as a question, an instruction, a request, etc. in natural language. The LLM can interpret the prompt, interact with the necessary API(s) and/or tool(s) to retrieve data internal to the organization, manipulate the data, and/or perform other non-information retrieval tasks, and provide a response in a user-friendly manner.

Information-seeking and/or task-oriented prompts specific to an organization may require the use of multiple APIs and/or tools associated with the organization to resolve these prompts (e.g., reach the desired goal states). For example, information needed for responding to a user's information-seeking prompt may be stored in multiple databases created for the organization. Thus, the actions identified by an LLM to reach the desired goal state may include many API calls and/or database calls to the different databases to retrieve the necessary/requested information. Similarly, with task-oriented prompts, not only are APIs and/or tools used to obtain information, but communication with other APIs and/or tools for performing various actions beyond information-retrieval are necessary to transition from an initial to a desired goal state set forth in the prompt.

For example, a user-submitted prompt may request to "Send an invoice to my client for the cake I baked last week and follow up weekly until my client has paid." To resolve this prompt and reach the desired goal state indicated by the prompt (e.g., reach a state where the invoice has been sent and weekly reminders have been and/or are currently being carried out), multiple APIs may be needed to obtain information about who the client is, how much each ingredient for the cake costs to determine the total cost of the cake, the client's contact information, the client's preferences for communication, etc. Further, additional APIs may be needed to carry out tasks such as creating the invoice, creating a medium for transmitting the invoice (e.g., an email), sending reminder notifications, etc. As such, the LLM may need to interface with multiple APIs (and/or other tools) of the organization to resolve the single prompt. An LLM, however, may only be capable of interfacing with a limited number of specifically designed APIs and/or tools, and thus may not be able to resolve the user's prompt.

In particular, a technical problem associated with the use of existing LLMs configured to interface with APIs and/or tools is their inability to scale beyond, for example, a limited and specific set of APIs and/or tools. This is especially problematic where a standard business organization has hundreds or thousands of APIs, applications, and tools in place. For example, existing API/tool-augmented LLMs are limited to connect with a small number of specially designed tools/APIs. For instance, Toolformer™, an API/tool-augmented LLM, created by Meta Platforms, Inc. (doing business as Meta™, and formerly named Facebook®, Inc.) of Menlo Park, California, is trained to use only five different tools: a question-answering API, a Wikipedia search engine, a machine translation system, a calculator, and a calendar. As another example, Chameleon™ is an LLM-based planner that assembles a sequence of tools, among a set of fifteen total tools, to execute to generate a final response. Thus, the potential for connecting LLMs with a large number of APIs, and specifically a large number of domain-specific APIs and/or tools that may be constantly changing, remains under-explored and challenging. For example, while LLMs may be fine-tuned/trained to use multiple APIs and make specific API calls, fine-tuning/training such LLMs is a costly exercise. Additionally, when there are overlapping functionalities in the available APIs, the LLM might not always be able to select the correct API. The reason for this is that the LLM treats the API selection as a classification problem and tries to find a "close"/probabilistic match, which may not always be the correct choice. In other words, LLMs are based on probabilistic generation of output based on input. As a result, LLM-generated plans, especially in the presence of a large number of APIs, are frequently wrong.

Another technical problem with using LLMs (e.g., where the LLM is configured to act as a planner) for solving domain-specific prompts, and more specifically domain-specific, task-oriented prompts, relates to the non-deterministic nature of such models. Specifically, LLMs predict the probability of a word or token given the context represented by a sample of words. The randomness in LLMs typically comes from the sampling methods used during text generation, such as top-k sampling and/or nucleus sampling. As a result, identical prompts may yield completely different responses in different requests. This non-determinism (i.e., this inconsistency in the responses generated in different requests with identical prompts) affects the accuracy, and thus reliability, of responses produced by these LLMs. For example, when using the LLM as a planner to solve the same information-seeking prompt or the same task-oriented prompt different times, different execution plans may be generated due to the non-determinism of the model.

Embodiments described herein overcome the aforementioned technical problems and improve upon the state of the art by providing a system, combining an LLM with a standalone classical AI planner (simply referred to herein as a "planner") and execution component, configured to process and answer prompts as planning problems. Specifically, the system processes a prompt as a planning problem by (1) leveraging the language capabilities of the LLM to translate the prompt into a structured input for the planner, such as a task description in planning domain definition language (PDDL) (described further below), (2) leveraging capabilities of the planner to generate an execution plan for the task description, where the execution plan involves interaction with one or more domain-specific APIs and/or tools, (3) leveraging the execution component to carry out the execution plan to resolve the prompt, and (4) again leveraging the LLM to generate a human-understandable response, through NLG, in response to the prompt and based on the output of executing the execution plan.

PDDL is the standardized language for expressing planning tasks. PDDL divides the description of a planning task into (1) a domain description and (2) a task description. In the domain description, invariant rules of a world model, like object types, predicates, and possible actions that may be performed, are described. The task description is based on the domain description and describes one concrete task/problem, specifying the objects that are part of the task/problem, an initial state, and the desired goal state that is to be fulfilled.

Embodiments described herein enable translating a natural language prompt (such as received by an LLM) into a plan-oriented language, such as PDDL, to facilitate planning for task execution (e.g., by the planner). To do so, an LLM may be configured to perform one or more NLP tasks. For example, a set of curated LLM prompts focusing on carrying out one or more NLP tasks may be fed to the LLM. The output of a prompt fed to the LLM may become the input for a next prompt to the LLM to carry out these NLP tasks. NLP tasks break down human text and/or voice data, provided as the prompt, in ways that help the LLM extract underlying meaning and/or goal(s) of the prompt. Example NLP tasks that may be performed by the LLM include tokenization, translation, semantic analysis, entity extraction, concepts extraction, dependency parsing, and/or topic analysis, to name a few (e.g., each of these tasks is described in detail below with respect to FIG. 1). Performance of such NLP tasks enables the LLM to separate the prompt into smaller units, referred to as "tokens," classify one or more of these tokens, and further use this classification to categorize one or more of these tokens as one or more elements of a domain description in PDDL. A task description in PDDL can be generated based on the categorization, where the task description is a resulting translation of the prompt into PDDL to facilitate execution plan generation by the planner to resolve the prompt.

Although use of the LLM enables prompts with structural and/or language variations to be modeled as task descriptions in PDDL, LLM techniques for generating the task descriptions in PDDL may not always guarantee correct PDDL generation. The reason for this is that the LLM may not necessarily understand (1) the semantics of the output language and/or (2) the relationship between the concepts of the domain description in PDDL. Further, the non-deterministic nature of the LLM may contribute to generating incorrect task descriptions in PDDL. As such, in some embodiments, the system further includes a validation component. The validation component uses an iterative approach to validate various aspects of a task description in PDDL generated by the LLM. If error(s) are identified via the iterative approach for a task description, then such error(s)

are used to generate a new prompt that is then fed back to the LLM for task description re-generation for a prompt.

The embodiments described herein provide significant technical advantages over conventional approaches. In particular, having an LLM interact with a separate planner, as opposed to having an LLM act as an imperfect planner, to process and answer prompts as planning problems enables the system described herein to leverage the strengths specific to the LLM and the strengths specific to the planner, which avoids the classical "jack of all trades, master of none," problem.

For example, planners are tools proven to be useful in generating accurate and optimal plans for planning problems, and orchestrating the execution of these plans, for example, by leveraging a large number of domain-specific APIs and/or tools. In particular, planning requires understanding the domain description and reasoning over the available APIs and their functionality. Thus, by using a planner in combination with an LLM, the need to train an LLM to infer and interact with an appropriate sequence of API(s) and/or tool(s) needed for processing and answering a prompt is eliminated (e.g., thereby decreasing training time and resources, reducing model size, and allowing for easier integration of new APIs and/or changed APIs (e.g., avoiding re-training of the entire LLM), among other advantages). Instead, the planner is leveraged for this functionality, and thus, the system is able to exploit a large number of domain-specific APIs and/or tools. Accordingly, the system described herein is an improved, scalable system that provides a prompt processing and answering solution for many domains (e.g., organizations), irrespective of the number of APIs and/or tools specific to those domains. In other words, the system may be capable of processing domain-specific information-seeking prompts and domain-specific task-oriented prompts that may require the use of many APIs and/or tools.

Further, by configuring the system to use a planner, as opposed to an LLM acting as a planner in conventional implementations, actions carried out and/or information provided to the user in response to a user-submitted prompt may be a more accurate response to the prompt. In particular, a planner is known to be more deterministic in nature than an LLM. As such, the planner may behave in a more well-defined and predictable manner than the LLM when generating an execution plan, to therefore reduce inconsistency in execution plan generation for a same prompt. Additionally, the use of a standalone planner offers a solution that helps reduce, if not eliminate, the generation of erroneous and/or nonsensical execution plans (e.g., referred to as "hallucinations") known to be more frequently generated when using LLMs as planners in conventional implementations. The reduction in inconsistency across similar prompt inputs, as well as the reduction (or elimination) of erroneous and/or nonsensical execution plans, leads to a more reliable and trustworthy system with prompt processing and answering functionality.

A planner, however, is generally designed to solve problems represented in a structured formal language, such as PDDL, and thus, may not be able to process a user-provided prompt in natural language. Thus, the system described herein leverages the language capabilities of LLMs to enable the system to comprehend, process, and respond to any prompt received as input. In particular, LLMs, such as GPTs, have the capability to very effectively act on natural language prompts, and in aspects described herein, to translate such natural language prompts to PDDL-formatted output suitable as an input to a planner. As such, the system, including an LLM in combination with a planner, is more adept at solving a wider range of prompts, including unstructured and/or incomplete prompts, which is a current limitation of existing classical AI planning systems. Additionally, generating content and/or responses understandable to humans has historically been a challenge for machines that do not know the complexities and nuances of language. Thus, by incorporating the LLM, the system is able to provide human-understandable responses, based on the output of executing an execution plan generated by the planner of the system, to thereby provide a more positive interaction between a user who submitted the prompt and the system.

Example System for Domain-Specific Prompt Processing and Answering

FIG. 1 depicts an example system 100 for processing and answering prompts as planning problems. As illustrated, system 100 includes an LLM 106, a planner 108, and an execution component 110, which, together, are configured to resolve a prompt 104 (e.g., created by a user 102). In some examples described herein, resolution of prompt 104 involves achieving a desired goal state indicated via prompt 104, as well as generating a natural language response 112 based on the desired goal state achieved. As described above, a prompt and/or a natural language response consists of terms or phrases spoken normally and/or entered as they might be spoken, without any special format and/or alteration of syntax.

User 102 creates and submits prompt 104 to LLM 106. User 102 may submit prompt 104 through a text interface (e.g., a chat interface), a voice interface (e.g., as through a smart device), and/or the like. In some embodiments, prompt 104 requests a state change from an initial state to a desired goal state, where the desired goal state is achieved based on the completion of an information retrieval task (e.g., prompt 104 is an "information-seeking prompt"). For example, prompt 104 may be a question, such as "What was Company X's revenue for the past month compared to the budgeted revenue?" or a statement, such as "Please provide information about student licensing exam passage rates for the past five years." In some embodiments, prompt 104 requests a state change from an initial state to a desired goal state, where the desired goal state is achieved based on the completion of one or more tasks, excluding information retrieval. For example, prompt 104 may be a narrative, such as "You control 2 robots. Each robot has a left gripper and a right gripper. There are two rooms and two balls. Robot 1 is in room 1. Robot 2 is in room 1. Ball 2 is in room 1. Ball 1 is in room 1. The robots' grippers are free. Your goal is to transport the balls to their destinations. Ball 1 should be in room 2. Ball 2 should be in room 2." In this example, the initial state is that all balls and robots are in room 1, and the robots' grippers are empty. Further, the desired goal state is that all balls are in room 2. In some embodiments, prompt 104 requests a state change from an initial state to a desired goal state, where the desired goal state is achieved based on the completion of multiple tasks including information retrieval. Further, prompt 104 may be related to a specific user or generic. For example, one prompt 104 may request to set a reminder to remind the user, who submitted prompt 104, about an upcoming town hall meeting, while another prompt 104 may request to set a reminder to remind all users within an organization about the upcoming town hall meeting.

LLM 106 translates prompt 104 into a structured input for planner 108 (e.g., at runtime). For example, LLM 106 translates prompt 104 into a task description in PDDL 116.

As described above, PDDL is the standardized language for expressing planning tasks. PDDL divides the description of a planning task into (1) a domain description and (2) a task description. Everything modeled in PDDL is based on a set of objects (e.g., things in the world that are of interest), where each object belongs to a certain type; however, creating descriptions without any typing is possible in PDDL. Objects modeled in PDDL may be referred to as a constant or as a variable. When a constant is used, then it is clear exactly which specific object is being referred to. For instance, "yard" and "house" may be constants of type "location," while "John" may be a constant of type "person." In contrast, when arguing about any applicable object, variables are used, such as the expression "(?l1?l2—location)" which refers to two arbitrary objects of type "location."

Predicates apply to a specific type of object, or to all objects. Predicates are either true or false at any point in a planning task. Consider an example predicate in a construction context of is "(walls-built?s—site)." In this example, when the predicate is true for a given construction site, then it is assumed that the site has had walls built for it. When the predicate is false, it can be assumed that the construction site does not have walls built for it yet.

Actions in the domain description define transformations in the state of the world (e.g., from a first state to a second state). This transformation is typically an action that could be performed in the execution of the planning problem, such as picking up an object, constructing something, and/or some other change.

LLM 106 may translate prompt 104 into a task description in PDDL by performing a series of tasks based on a set of curated LLM prompts (referred to herein as "translation prompts") fed to LLM 106. In some cases, the translation prompts are engineered manually, and the LLM is programmatically called with the engineered prompts. The translation prompts may instruct LLM 106 to identify and classify tokens in prompt 104. To identify and classify the tokens of prompt 104, LLM 106 may perform various NLP tasks.

One example NLP task that may be performed by LLM 106 (e.g., based on receiving a translation prompt instructing LLM 106 to perform the NLP task) includes tokenization. Tokenization breaks unstructured data and natural language text in prompt 104 into chunks of information, referred to as "tokens," that can be considered as discrete elements. The tokens may include sentences, words, characters, and/or sub-words of prompt 104. Together, the tokens make up a vector representing prompt 104. For example, a prompt of "Provide salaries for all employees" may be tokenized into "Provide," "salaries," "for," "all," and "employees." Tokenization may be the first NLP task performed by LLM 106 (e.g., based on an initial prompt received by LLM 106), given these tokens may help in understanding the context and/or interpreting the meaning of text in prompt 104.

Another example NLP task that may be performed by LLM 106 (e.g., based on receiving another translation prompt instructing LLM 106 to perform the NLP task) includes entity extraction. Entity extraction is a text analysis technique that uses NLP to identify specific data from unstructured text, such as prompt 104, and classify it according to predefined categories. These pre-defined categories are named entities, the words or phrases that represent a noun (e.g., these pre-defined categories are different than the "object types" in the domain description, as described above). This may include proper names and numerical expressions of time or quantity, such as phone numbers, monetary values, and/or dates. Entity extraction enables LLM 106 to find meaningful information in the unstructured text data of prompt 104.

Another example NLP task that may be performed by LLM 106 (e.g., based on receiving another translation prompt instructing LLM 106 to perform the NLP task) includes concept extraction. Concepts extraction is a process to identify phrases referring to concepts of interest in unstructured text, such as prompt 104. These concepts may include named entities (e.g., people, organizations, locations, etc.), key phrases, domain-specific terms, and/or relationships between entities, to name a few.

Another example NLP task that may be performed by LLM 106 (e.g., based on receiving another translation prompt instructing LLM 106 to perform the NLP task) includes semantic analysis. Semantic analysis may include identifying semantic relationships and/or performing semantic role labeling in prompt 104.

Semantic relationships are the associations that exist between the meanings of words (e.g., semantic relationships at a word level), between the meanings of phrases (e.g., semantic relationships at a phrase level), or between the meanings of sentences (e.g., semantic relationships at a sentence level). At the word level, semantic relationships that are analyzed may include synonymy, antonymy, homonymy, polysemy, etc. At a phrase and/or sentence level, semantic relationships that are analyzed may include paraphrases, entailment, contradiction, etc.

Semantic role labeling is an NLP task that involves assigning semantic roles to words or phrases in prompt 104 and capturing their relationships to a predicate of prompt 104. In linguistics, a semantic predicate, also known as the main verb, is a word or phrase that expresses the main action, state, or occurrence in text, such as prompt 104. The goal of semantic role labeling is to understand the underlying meaning and/or roles played by different tokens in prompt 104, such as agents (e.g., the doer of an action), recipients (e.g., the role of being acted upon), locations, etc., in expressing an action and/or event. Semantic role labeling plays an important role in revealing the underlying structure of prompt 104, thereby enabling more profound analysis and comprehension of the text.

Another example NLP task that may be performed by LLM 106 (e.g., based on receiving another translation prompt instructing LLM 106 to perform the NLP task) includes dependency parsing. Dependency parsing is the process used to analyze the grammatical structure in text, such as prompt 104, and identify related words and/or phrases, as well as the type of the relationship between them. Each relationship has one "head" and a "dependent" that modifies the head. Each relationship is labeled according to the nature of the dependency between the respective head and the respective dependent. Understanding the relationships between words and/or phrases may be important for semantics, i.e., understanding the meaning of text. For example, assuming prompt 104 contains the phrase "black car," "car" acts as the head while "black" acts at the dependent of the head. The nature of the relationship here is "amod," which stands for "adjectival modifier." It is an adjective or an adjective phrase that modifies a noun.

Another example NLP task that may be performed by LLM 106 (e.g., based on receiving another translation prompt instructing LLM 106 to perform the NLP task) includes topic and/or sub-topic analysis. Topic and/or sub-topic analysis is an NLP technique used to extract meaning from text by identifying recurrent themes and/or topics. In some embodiments, topic and/or sub-topic analysis is applied at the sentence level to determine the topic of a single sentence. In some embodiments, topic and/or sub-topic analysis is applied at the sub-sentence level to determine the topics of sub-expressions within a single sentence.

After identifying and classifying tokens in prompt 104 via one or more of the above-described example NLP tasks, LLM 106 may have a better understanding of prompt 104 such that LLM 106 is able to generate a task description in PDDL 115 for prompt 104. For example, to generate a task description in PDDL 115, LLM 106 extracts information about (1) object types used to categorize objects and (2) predicates identifying relationships between objects that may be true or false, both of which are declared in a pre-created domain description in PDDL (not shown in FIG. 1). Object types and predicates declared in the domain description in PDDL provide domain knowledge, or pre-existing artifacts, that specify how a domain is to be understood and acted upon.

LLM 106 then attempts to categorize one or more tokens of prompt 104 (e.g., tokenized via tokenization pre-processing, as described above) as one or more objects, one or more of the object types extracted from the domain description in PDDL, and/or one or more of the predicates extracted from the domain description in PDDL. In other words, LLM 106 may attempt to map one or more of the tokens of prompt 104 to specified target language, e.g., PDDL. LLM 106 may determine the "best" candidates/tokens for mapping to language that is to be included in the target description in PDDL 115. LLM 106 may perform this mapping to PDDL based on the classification of the token(s) via the one or more NLP tasks.

LLM 106 generates a task description in PDDL 115 using the categorization of the token(s) of prompt 104 to object(s), object type(s), and/or predicate(s). An example of generating a task description in PDDL based on a domain description in PDDL and categorizing a prompt is depicted in FIG. 2.

Figure 2:
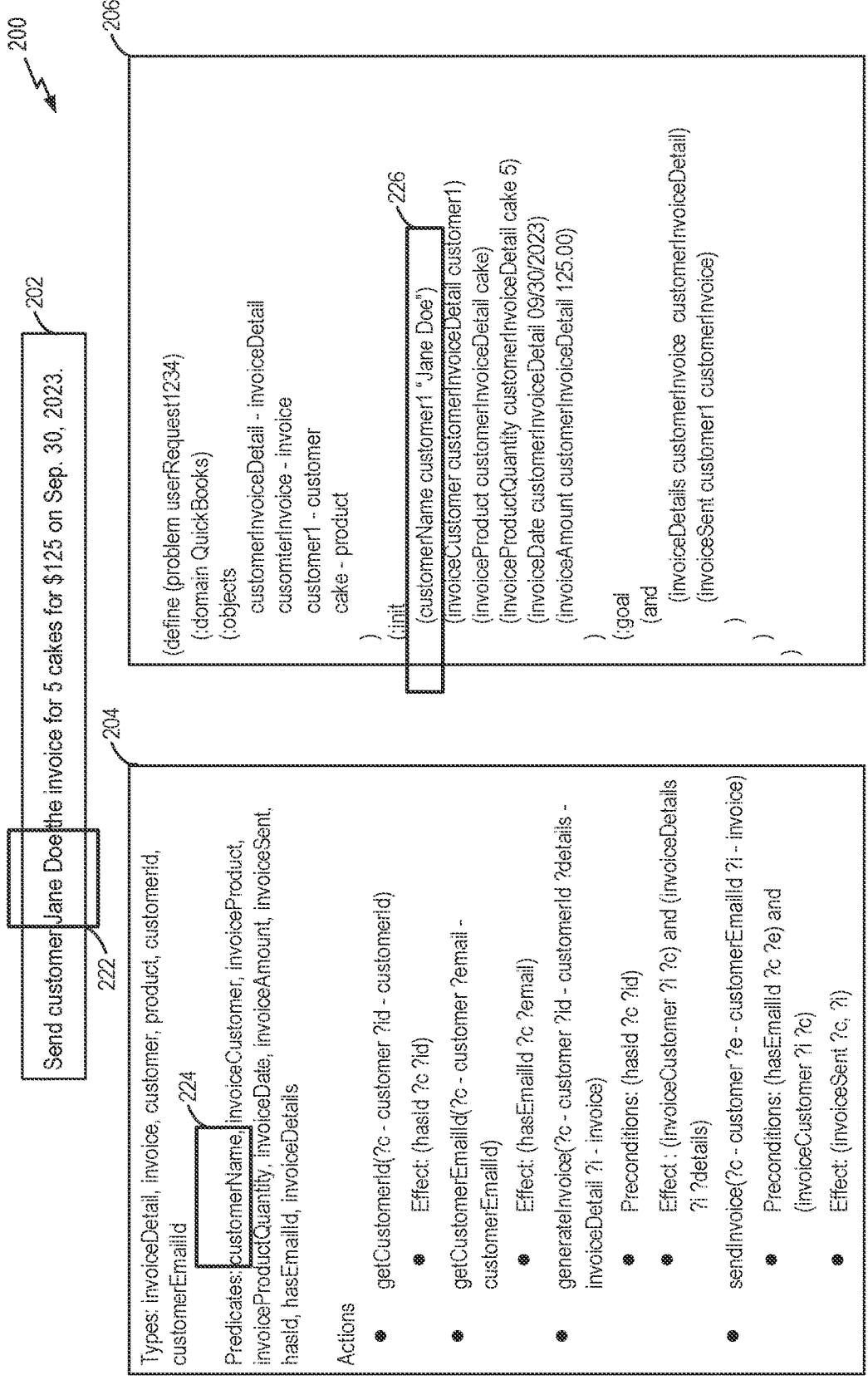
FIG. 2 depicts an example task description and an example domain description in planning domain definition language.

For example, FIG. 2 depicts a prompt 202 (e.g., an example of prompt 104 in FIG. 1), a domain description in PDDL 204, and a task description in PDDL 206 (e.g., an example of task description in PDDL 115 in FIG. 1). Prompt 202 is an information-seeking and task-oriented prompt requesting to "Send customer Jane Doe the invoice for 5 cakes for $125 on Sep. 30, 2023." Task description in PDDL 206 is generated based on domain description in PDDL 204 and a categorization of token(s) in prompt 202.

For example, an LLM, such as LLM 106 in FIG. 1, performs one or more NLP tasks (e.g., based on receiving a set of curated LLM prompts focusing on carrying out the one or more NLP tasks) to understand the semantic features of prompt 202. For example, the LLM may identify text 222 "Jane Doe" from other unstructured text included in prompt 202 when performing tokenization. The LLM may classify text 222 "Jane Doe" as a proper name or a named entity when performing entity extraction and/or concept extraction. The LLM may assign text 222 "Jane Doe" the semantic role of "recipient," or in other words, identify text "Jane Doe" as the entity undergoing the effect of some action.

Next, the LLM extracts object types and predicates defined in domain description in PDDL 204. Domain description in PDDL 204 may have existed prior to the LLM receiving prompt 202. The object types (e.g., shown as "Types" in FIG. 2) in domain description in PDDL 204 include invoiceDetail, invoice, customer, product, customerId, and customerEmailId. The predicates in domain description in PDDL 204 include customerName, invoice- Customer, invoiceProduct, invoiceProductQuantity, invoiceDate, invoiceAmount, invoiceSent, hasId, hasE-mailId, and invoiceDetails.

The LLM then attempts to categorize one or more of the identified tokens of natural language prompt 202 as one or more objects, object types included in domain description in PDDL 204, and/or predicates included in domain description in PDDL 204. The LLM then uses this categorization to construct task description in PDDL 206.

For example, the LLM may determine that text 222 "Jane Doe" is a good candidate for predicate 224 "customer-Name." The LLM may then use this categorization to construct task description in PDDL 206, which includes objects with their identified object type (e.g., from domain description in PDDL 204), an initial state (e.g., shown as "init") determined from prompt 202, and a desired goal state (e.g., shown as "goal"), also determined from prompt 202. Because the customer name is a known fact prior to any resolution of the prompt 202, the mapping of text 222 "Jane Doe" to predicate 224 "customerName" is included as information 226 under the initial state defined in task description in PDDL 206. Similar steps may be used to represent prompt 202 as a planning problem, and thus generate the remainder of task description in PDDL 206. The initial state defined in final task description in PDDL 206 includes information about Jane Doe as the customer, cake as the product needing to be invoiced, $125.00 as the amount that needs to be invoiced, etc., all within a structured language and format that can be understood by a planner, such as planner 108 in FIG. 1. Further, the desired goal state defined in final task description in PDDL 206 includes information (also in the structured language and format that can be understood by a planner, such as planner 108 in FIG. 1) about needing invoice transmission, given prompt 202 is requesting that an invoice be sent to customer Jane Doe.

In FIG. 1, validation component 122 receives task description in PDDL 115 generated by LLM 106 for prompt 104. Validation component 122 is used to determine whether one or more validation errors exist in the task description in PDDL 115. For example, validation component 122 may perform grammar and semantic post-processing of the generated task description in PDDL 115 to identify any language-specific errors and/or deviation from the target language expected for the task description in PDDL 115. Further, validation component 122 may determine whether the task description in PDDL 115 conforms to the layout and/or elements expected to be found in a task description in PDDL (e.g., by comparison against a template), as well as if those elements are defined in the domain description in PDDL used to create the task description in PDDL 115. If one or more validation errors are determined to exist, validation component 122 generates feedback that encapsulates information about the one or more errors and provides this feedback to validation error-based prompt generation component 124. Validation error-based prompt generation component 124 uses this feedback to generate a new prompt that is fed back to LLM 106, thereby triggering LLM 106 to generate a new task description in PDDL 115. This prompt may include information that helps LLM 106 to correct the one or more errors in the subsequent generation of the task description in PDDL 115. Additional details regarding task description validation, as well as feedback and prompt generation, are provided below with respect to FIG. 3.

In some embodiments, for each new task description in PDDL 115 that is created (e.g., based on identifying error(s) in a previously generated task description in PDDL 115), validation component 122 may determine if one or more errors exist, and if one or more errors are determined to exist, then validation component 122 may determine if a termination condition has been met. As long as the termination condition has not been met, then validation component 122 may continue to provide the error feedback to validation error-based prompt generation component 124. However, if a termination condition has been met, then validation component 122 may alternatively generate an error message, and provide this error message to user 102.

For example, a termination condition may indicate that if a number of attempts to generate a task description in PDDL 115 exceeds a task description generation threshold number, such as ten, then validation component 122 is to generate an error message for user 102. Thus, in a case where validation component 122 determines that a third task description in PDDL 115 generated by LLM 106 (e.g., after previously determining two generated task descriptions in PDDL 115 included errors) includes predicates that are not included in the domain description in PDDL (i.e., an error is again identified), validation component 122 generates feedback for this error and provides this feedback to validation error-based prompt generation component 124 given the number of attempts to generate the task description in PDDL 115 does not exceed the threshold (e.g., 3 attempts <10 attempts threshold). On the other hand, if the current attempt is the tenth atempt to generate the task description in PDDL 115, then validation component 122 generates and error message (e.g., 10 attempts=10 attempts threshold).

After one or more iterations, validation component 122 may determine that generated task description in PDDL 115 is valid and provide this task description in PDDL 115 to planner 108 as task description in PDDL 116 (e.g., a validated/correct task description in PDDL 115 is the same as task description in PDDL 116). Task description in PDDL 116 represents a valid task description in PDDL, while task description in PDDL 115 may or may not be valid. Planner 108 uses task description in PDDL 116, as well as a pre-created domain description in PDDL (not shown in FIG. 1), to generate an execution plan 118.

Execution plan 118 includes a sequence of steps used to transform the initial state to the desired goal state originally indicated in prompt 104. Steps defined in execution plan 118 may include interfacing with application(s) (e.g., via API(s), using tools, and/or accessing database(s)) specific to one or more organizations. For the example in FIG. 2, execution plan 118 may include steps such as those actions identified in domain description in PDDL 204. For example, execution plan 118 may include actions (1) "getCustomerID", (2) "getCustomerEmailId", (3) "generateInvoice", and (4) "sendInvoice". Planner 108 provides execution plan 118 to execution component 110 to carry out the defined steps.

Execution component 110 executes steps of execution plan 118 in the order in which they are outlined in execution plan 118. Execution component 110 may make API call(s) to one or more applications 144, initiate database query(ies) for one or more databases 146, and/or trigger one or more functions (e.g., via one or more tools 142), as defined by execution plan 118. Essentially, execution component 110 executes the sequence of steps defined in execution plan 118 to transition to the desired goal state. For the example in FIG. 2, execution component 110 may (1) get the customer ID for Jane Doe, (2) get the email associated with Jane Doe's customer ID, (3) generate an invoice to be sent to Jane Doe for the 5 cakes for $125, and (4) actually send the invoice, via email, to Jane Doe.

Execution of the sequence of steps defined in execution plan 118 results in an execution output 120. Execution output 120 may be a structural representation of the answer, and/or all the information needed to generate a final answer to prompt 104. For example, where the prompt is "Please provide information about student licensing exam passage rates for the past five years," then the execution output may include an average and/or individual student licensing exam passage rates for years 2018, 2019, 2020, 2021, and 2022. As another example, where the prompt is "Please send an email reminder to Client Y about our upcoming meeting," then execution output 120 may be a confirmation message that the requested email was sent. For the example in FIG. 2, execution output 120 may be "The invoice for the 5 cakes for $125 has been sent to customer Jane Doe."

LLM 106 uses execution output 120 to generate natural language response 112, which is then provided to user 102 in response to user 102 submitting prompt 104.

Example Workflow for Validating Task Descriptions in PDDL

Figure 3:
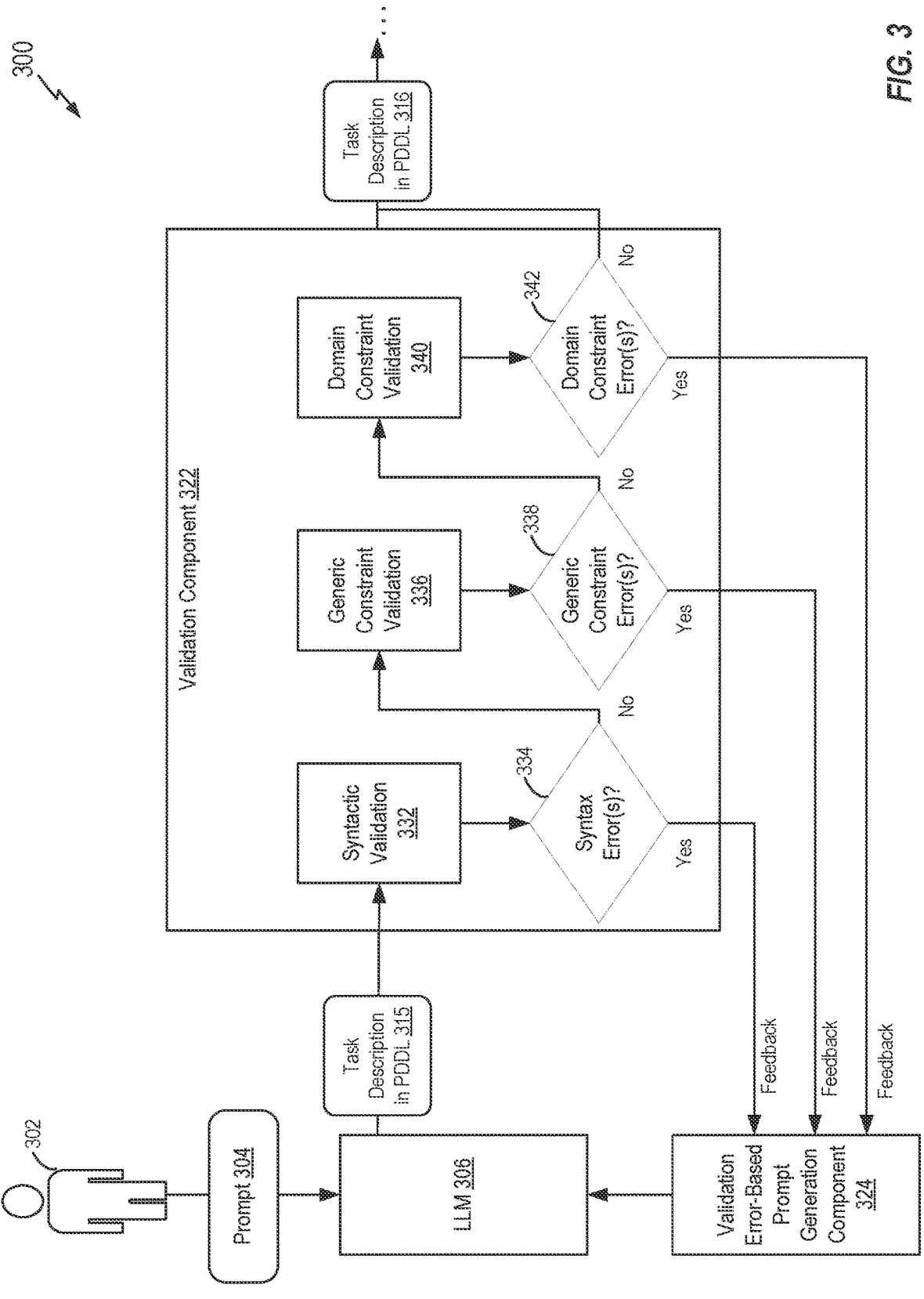
FIG. 3 depicts an example workflow for validating task descriptions in planning domain definition language.

FIG. 3 depicts an example workflow 300 for validating task descriptions in PDDL. Workflow 300 is performed by LLM 306, validation component 322, and validation error-based prompt generation component 324, which may be examples of LLM 106, validation component 122, and validation error-based prompt generation component 124, respectively, depicted and described with respect to FIG. 1. Similarly, prompt 304, task description in PDDL 315, and task description in PDDL 316 shown in FIG. 3 as inputs and/or outputs for each of LLM 306, validation component 322, and validation error-based prompt generation component 324 may be examples of prompt 104, task description in PDDL 115, and task description in PDDL 116, respectively, depicted and described with respect to FIG. 1.

Workflow 300 begins with user 302 (e.g., similar to user 102 in FIG. 1) creating and submitting a prompt 304 to LLM 306. An example of prompt 304 may be prompt 202 in FIG. 2 requesting to "Send customer Jane Doe the invoice for 5 cakes for $125 on Sep. 30, 2023."

Workflow 300 then proceeds with LLM 306 (1) identifying and classifying a plurality of tokens in prompt 304 (e.g., via performance of one or more NLP tasks as described above), (2) extracting from a domain description in PDDL (e.g., such as domain description in PDDL 204 in FIG. 2) object types and predicates, and (3) categorizing token(s) in prompt 304 as one or more objects, one or more of the object types, or one or more of the predicates based on the classification of the token(s). LLM 306 then generates task description in PDDL 315 based on the categorization and provides task description in PDDL 315 to validation component 322.

As shown in FIG. 3, validation component 322 is configured to perform syntactic validation 332, generic constraint validation 336, and/or domain constraint validation 340 to determine whether task description in PDDL 315 was generated with any error(s) (collectively referred to herein as "validation error(s)"), prior to passing task description in PDDL 315 (as task description in PDDL 316) to a planner (not shown), such as planner 108 in FIG. 1.

Thus, after receiving a task description in PDDL 315, validation component 322 begins the validation process by first performing syntactic validation 332. Syntactic validation 332 is performed to check whether the task description in PDDL 315 conforms to a general task description template syntactically. For example, validation component 322 may check whether parentheses used in the task description in PDDL 315 are all closed, whether commas are used and, if so, whether they are used in the correct places in the task description in PDDL 315, whether the grammar used is correct, and/or the like. If during syntactic validation 332, validation component 322 identifies one or more syntax errors, syntactic validation 332 fails, and validation component 322 generates feedback for validation-error-based prompt generation component 324 (e.g., shown at 334 with the "yes" arrow). In other words, if syntactic validation 332 fails, generic constraint validation 336 and domain constraint validation 340 are not performed, and instead, the error(s) are indicated to validation error-based prompt generation component 324. The feedback is provided to validation-error-based prompt generation component 324 to trigger validation error-based prompt generation component 324 to generate a new prompt based on the syntax error(s) identified. This new prompt is then fed back to LLM 306, thereby instructing LLM 306 to generate a new task description in PDDL 315 for prompt 304 that fixes the one or more syntax errors.

Alternatively, if during syntactic validation 332, validation component 322 does not identify one or more syntax errors, the task description in PDDL 315 has passed syntactic validation 332, and validation component 322 proceeds with performing generic constraint validation 336 (e.g., shown at 334 with the "no" arrow). Generic constraint validation 336 is performed to check whether the task description in PDDL 315 includes elements defined and declared in the domain description in the PDDL. For example, validation component 322 may check whether the task description in PDDL 315 has both initial and goal states defined, whether task description in PDDL 315 defines one or more objects, whether the task description in PDDL 315 uses only predicates and object types defined in the domain description in PDDL, whether the predicates used in the task description in PDDL 315 match those defined in the domain description in PDDL 315, and/or the like. If during generic constraint validation 336, validation component 322 identifies one or more generic constraint errors, generic constraint validation 336 fails, and validation component 322 generates feedback for validation-error-based prompt generation component 324 (e.g., shown at 338 with the "yes" arrow). In other words, if generic constraint validation 336 fails, domain constraint validation 340 is not performed, and instead, the error(s) are indicated to validation error-based prompt generation component 324. The feedback is provided to validation-error-based prompt generation component 324 to trigger validation error-basedcomponent based prompt generation 324 to generate a new prompt based on the generic constraint error(s) identified. This new prompt is then fed back to LLM 306, thereby instructing LLM 306 to generate a new task description in PDDL 315 for prompt 304 that fixes the one or more generic constraint errors.

Alternatively, if during generic constraint validation 336, validation component 322 does not identify one or more generic constraint errors, the task description in PDDL 315 has passed syntactic validation 332 and generic constraint validation 336, and validation component 322 proceeds with performing domain constraint validation 340 (e.g., shown at 338 with the "no" arrow). Domain constraint validation 340 is performed to check the whether task description in PDDL 315 is consistent with constraints defined in the domain description in PDDL. For example, in the blocks world domain, a block must be either on the table (e.g., in a first state) or on another block (e.g., in a second state), but not both at the same time. If a task description in PDDL has a block in both the first and second states, however, then the task description in PDDL is invalid with respect to the domain constraints.

If during domain constraint validation 340, validation component 322 identifies one or more domain constraint errors, domain constraint validation 340 fails, and validation component 322 generates feedback for validation-error-based prompt generation component 324 (e.g., shown at 338 with the "yes" arrow). The feedback is provided to validation-error-based prompt generation component 324 to trigger validation error-based prompt generation component 324 to generate a new prompt based on the domain constraint error(s) identified. This new prompt is then fed back to LLM 306, thereby instructing LLM 306 to generate a new task description in PDDL 315 for prompt 304 that fixes the one or more domain constraint errors.

Alternatively, if during domain constraint validation, validation component 322 does not identify one or more domain constraint errors in the task description in PDDL 315, validation component 322 determines that the task description in PDDL 315 has passed syntactic validation 332, generic constraint validation 336, and domain constraint validation 340. Thus, validation component 322 determines that the task description in PDDL 315 was generated by LLM 306 without error and provides the task description in PDDL 315, as the task description in PDDL 316 (e.g., an error-free task description in PDDL) to a planner, such as planner 108 in FIG. 1.

Example Method for Prompt Translation

FIG. 4 depicts an example method for prompt translation. Method 400 may be performed by one or more processor(s) of a computing device, such as processor(s) 502 of processing system 500 described below with respect to FIG. 5.

Method 400 begins, at step 402, with identifying and classifying a plurality of tokens in a prompt using an LLM, the prompt requesting a state change from an initial state to a desired goal state. In some embodiments, the desired goal state requested by the prompt is a possession of information, a completion of one or more tasks excluding information retrieval, or a completion of one or more tasks, including information retrieval.

Method 400 proceeds, at step 404, with extracting from a domain description in a PDDL object types used to categorize objects and predicates identifying relationships between the objects that may be true or false.

Method 400 proceeds, at step 406, with categorizing at least one token of the plurality of tokens in the prompt as one or more of the objects, one or more of the object types, or one or more of the predicates based on the classification of the at least one token determined by the LLM.

Method 400 proceeds, at step 408, with generating a task description in the PDDL based on the categorization of the at least one token of the plurality of tokens, the task description comprising a translation of the prompt into a structured input for a planner.

In some embodiments, method 400 further includes steps for determining one or more validation errors exist in the task description in the PDDL and determining whether a termination condition has been met. When the termination condition has been met, method 400 further includes steps for generating an error message. Alternatively, when the termination condition has not been met, method 400 further includes steps for generating a new task description in the PDDL to fix the one or more validation errors.

In some embodiments, determining whether the termination condition has been met comprises determining the termination condition has been met based on a number of task description generation attempts exceeding a task description generation threshold number.

In some embodiments, determining whether the one or more validation errors exist in the task description in the PDDL comprises performing at least one of: syntactic validation to check whether the task description conforms to a general task description template syntactically; generic constraint validation to check whether the task description includes elements declared in the domain description in the PDDL; or domain constraint validation to check whether the task description is consistent with constraints defined in the domain description in the PDDL.

In some embodiments, determining whether the one or more validation errors exist in the task description in the PDDL comprises performing the syntactic validation, without performing the generic constraint validation and the domain constraint validation, and the one or more validation errors are determined when performing the syntactic validation.

In some embodiments, determining whether the one or more validation errors exist in the task description in the PDDL comprises performing the syntactic validation and the generic constraint validation, without performing the domain constraint validation, the one or more validation errors are determined when performing the generic constraint validation, and the generic constraint validation is performed after performing the syntactic validation.

Note that FIG. 4 is just one example of a method, and other methods including fewer, additional, or alternative steps are possible consistent with this disclosure.

Example Processing System for Prompt Translation

Figure 5:
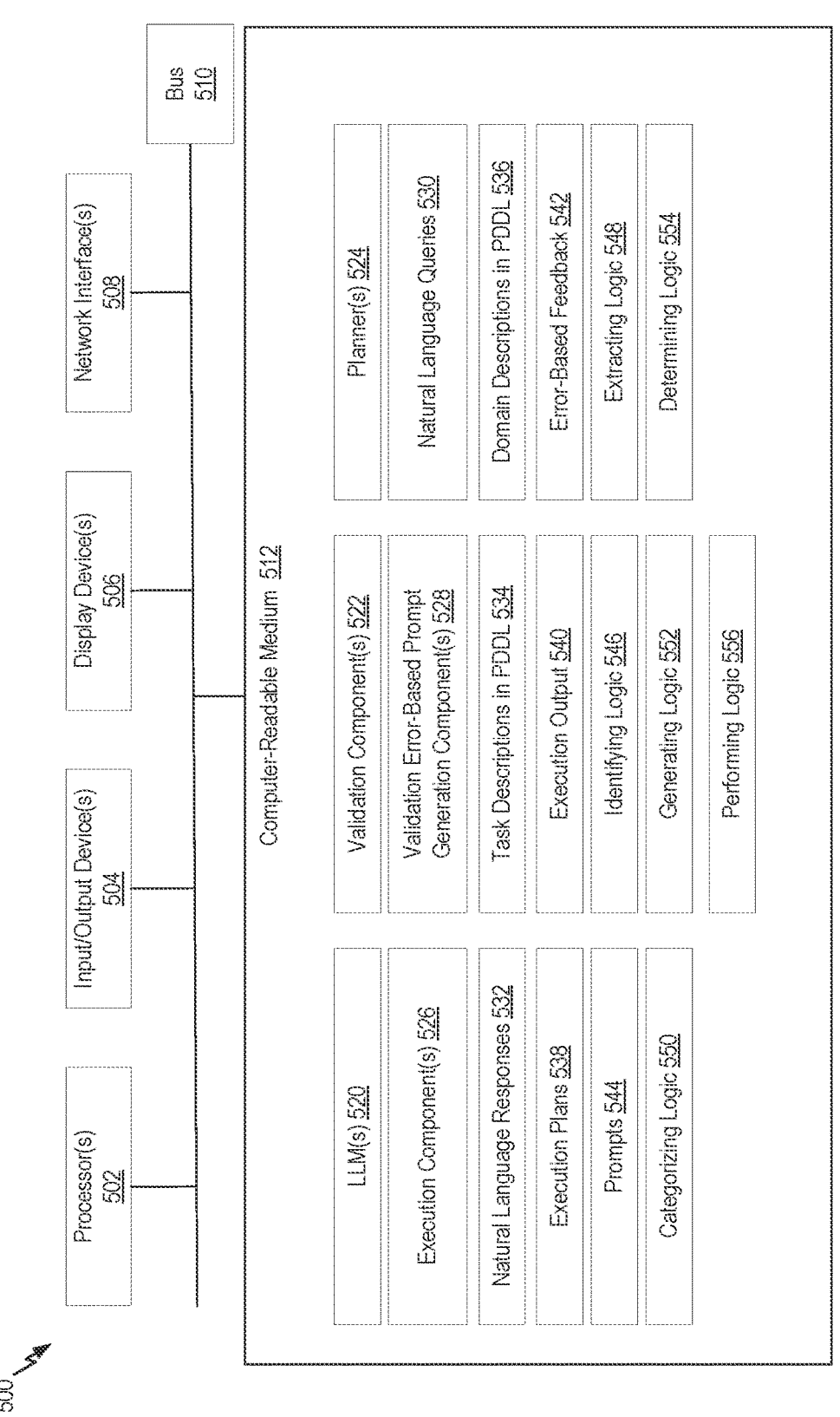
FIG. 5 depicts an example processing system with which aspects of the present disclosure can be performed.

FIG. 5 depicts an example processing system 500 configured to perform various aspects described herein, including, for example, method 400 as described above with respect to FIG. 4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes LLM(s) 520, validation component(s) 522, planner(s) 524, execution component(s) 526, validation error-based prompt generation component(s) 528, natural language queries 530, natural language responses 532, task descriptions in PDDL 534, domain descriptions in PDDL 536, execution plans 538, execution output 540, error-based feedback 542, prompts 544, identifying logic 546, extracting logic 548, categorizing logic 550, generating logic 552, determining logic 554, and performing logic 556.

In some embodiments, identifying logic 546 includes logic for identifying and classifying a plurality of tokens in a prompt using an LLM, the prompt requesting a state change from an initial state to a desired goal state.

In some embodiments, extracting logic 548 includes logic for extracting from a domain description in a planning domain definition language (PDDL): object types used to categorize objects; and predicates identifying relationships between the objects that may be true or false.

In some embodiments, categorizing logic 550 includes logic for categorizing at least one token of the plurality of tokens in the prompt as one or more of the objects, one of the object types, or one or more of the predicates based on the classification of the at least one token determined by the LLM.

In some embodiments, generating logic 552 includes logic for generating a task description in the PDDL based on the categorization of the at least one token of the plurality of tokens, the task description comprising a translation of the prompt into a structured input for a planner. In some embodiments, generating logic 552 includes logic for generating an error message. In some embodiments, generating logic 552 includes logic for generating a new task description in the PDDL to fix the one or more validation errors.

In some embodiments, determining logic 554 includes logic for determining one or more validation errors exist in the task description in the PDDL. In some embodiments, determining logic 554 includes logic for determining whether a termination condition has been met. In some embodiments, determining logic 554 includes logic for determining the termination condition has been met based on a number of task description generation attempts exceeding a task description generation threshold number.

In some embodiments, performing logic 556 includes logic for performing syntactic validation to check whether the task description conforms to a general task description template syntactically. In some embodiments, performing logic 556 includes logic for performing generic constraint validation to check whether the task description includes elements declared in the domain description in the PDDL. In some embodiments, performing logic 556 includes logic for performing domain constraint validation to check whether the task description is consistent with constraints defined in the domain description in the PDDL. In some embodiments, performing logic 556 includes logic for performing the syntactic validation, without performing the generic constraint validation and the domain constraint validation. In some embodiments, performing logic 556 includes logic for performing the syntactic validation and the generic constraint validation, without performing the domain constraint validation.

Example Clauses

Implementation examples are described in the following numbered clauses:

Clause 1: A method of query processing, comprising: identifying and classifying a plurality of tokens in a prompt using a large language model (LLM), the prompt requesting a state change from an initial state to a desired goal state; extracting from a domain description in a planning domain definition language (PDDL): object types used to categorize objects; and predicates identifying relationships between the objects that may be true or false; categorizing at least one token of the plurality of tokens in the prompt as one or more of the objects, one or more of the object types, or one or more of the predicates based on the classification of the at least one token determined by the LLM; and generating a task description in the PDDL based on the categorization of the at least one token of the plurality of tokens, the task description comprising a translation of the prompt into a structured input for a planner.

Clause 2: The method of Clause 1, further comprising: determining one or more validation errors exist in the task description in the PDDL; determining whether a termination condition has been met; when the termination condition has been met, generating an error message; and when the termination condition has not been met, generating a new task description in the PDDL to fix the one or more validation errors.

Clause 3: The method of Clause 2, wherein determining whether the termination condition has been met comprises determining the termination condition has been met based on a number of task description generation attempts exceeding a task description generation threshold number.

Clause 4: The method of any one of Clauses 2-3, wherein determining whether the one or more validation errors exist in the task description in the PDDL comprises performing at least one of: syntactic validation to check whether the task description conforms to a general task description template syntactically; generic constraint validation to check whether the task description includes elements declared in the domain description in the PDDL; or domain constraint validation to check whether the task description is consistent with constraints defined in the domain description in the PDDL.

Clause 5: The method of Clause 4, wherein: determining whether the one or more validation errors exist in the task description in the PDDL comprises performing the syntactic validation, without performing the generic constraint validation and the domain constraint validation, and the one or more validation errors are determined when performing the syntactic validation.

Clause 6: The method of Clause 4, wherein: determining whether the one or more validation errors exist in the task description in the PDDL comprises performing the syntactic validation and the generic constraint validation, without performing the domain constraint validation, the one or more validation errors are determined when performing the generic constraint validation, and the generic constraint validation is performed after performing the syntactic validation.

Clause 7: The method of any one of Clauses 1-6, wherein the desired goal state requested by the prompt comprises: a possession of information; a completion of one or more tasks excluding information retrieval; or a completion of one or more tasks including the information retrieval.

Clause 8: A processing system, comprising: one or more memories comprising processor-executable instructions; and one or more processors configured to execute the processor-executable instructions and cause the processing system to perform a method in accordance with any one of Clauses 1-7.

Clause 9: A processing system, comprising means for performing a method in accordance with any one of Clauses 1-7.

Clause 10: A non-transitory computer-readable medium storing program code for causing a processing system to perform the steps of any one of Clauses 1-7.

Clause 11: A computer program product embodied on a computer-readable storage medium comprising code for performing a method in accordance with any one of Clauses 1-7.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of prompt translation, comprising:

identifying and classifying a plurality of tokens in a prompt using a large language model (LLM), the prompt requesting a state change from an initial state to a desired goal state;

extracting from a domain description in a planning domain definition language (PDDL):

object types used to categorize objects; and predicates identifying relationships between the objects that may be true or false;

categorizing at least one token of the plurality of tokens in the prompt as one or more of the objects, one or more of the object types, or one or more of the predicates based on a classification of the at least one token determined by the LLM;

generating a task description in the PDDL based on categorization of the at least one token of the plurality of tokens, the task description comprising a translation of the prompt into a structured input for a planner;

determining one or more validation errors exist in the task description in the PDDL;

determining whether a termination condition has been met;

when the termination condition has been met, generating an error message; and when the termination condition has not been met, generating a new task description in the PDDL to fix the one or more validation errors.

2. The method of claim 1, wherein determining whether the termination condition has been met comprises determining the termination condition has been met based on a number of task description generation attempts exceeding a task description generation threshold number.

3. The method of claim 1, wherein determining whether the one or more validation errors exist in the task description in the PDDL comprises performing at least one of:

syntactic validation to check whether the task description conforms to a general task description template syntactically;

generic constraint validation to check whether the task description includes elements declared in the domain description in the PDDL; or domain constraint validation to check whether the task description is consistent with constraints defined in the domain description in the PDDL.

4. The method of claim 3, wherein:

determining whether the one or more validation errors exist in the task description in the PDDL comprises performing the syntactic validation, without performing the generic constraint validation and the domain constraint validation, and the one or more validation errors are determined when performing the syntactic validation.

5. The method of claim 3, wherein:

determining whether the one or more validation errors exist in the task description in the PDDL comprises performing the syntactic validation and the generic constraint validation, without performing the domain constraint validation, the one or more validation errors are determined when performing the generic constraint validation, and the generic constraint validation is performed after performing the syntactic validation.

6. The method of claim 1, wherein the desired goal state requested by the prompt comprises:

a possession of information;

a completion of one or more tasks excluding information retrieval; or a completion of one or more tasks including the information retrieval.

7. The method of claim 1, wherein identifying and classifying the plurality of tokens in the prompt using the LLM comprises prompting, via a set of prompts, the LLM to perform a series of natural language processing (NLP) tasks.

8. A processing system, comprising:

one or more memories comprising processor-executable instructions; and one or more processors configured to execute the processor-executable instructions and cause the processing system to:

identify and classify a plurality of tokens in a prompt using a large language model (LLM), the prompt requesting a state change from an initial state to a desired goal state;

extract from a domain description in a planning domain definition language (PDDL):

object types used to categorize objects; and predicates identifying relationships between the objects that may be true or false;

categorize at least one token of the plurality of tokens in the prompt as one or more of the objects, one or more of the object types, or one or more of the predicates based on a classification of the at least one token determined by the LLM;

generate a task description in the PDDL based on categorization of the at least one token of the plurality of tokens, the task description comprising a translation of the prompt into a structured input for a planner;

determine one or more validation errors exist in the task description in the PDDL;

determine whether a termination condition has been met;

when the termination condition has been met generate an error message; and when the termination condition has not been met, generate a new task description in the PDDL to fix the one or more validation errors.

9. The processing system of claim 8, wherein to determine whether the termination condition has been met, the one or more processors are configured to execute the processor-executable instructions and cause the processing system to determine the termination condition has been met based on a number of task description generation attempts exceeding a task description generation threshold number.

10. The processing system of claim 8, wherein to determine whether the one or more validation errors exist in the task description in the PDDL, the one or more processors are configured to execute the processor-executable instructions and cause the processing system to perform at least one of:

syntactic validation to check whether the task description conforms to a general task description template syntactically;

generic constraint validation to check whether the task description includes elements declared in the domain description in the PDDL; or domain constraint validation to check whether the task description is consistent with constraints defined in the domain description in the PDDL.

11. The processing system of claim 10, wherein:

to determine whether the one or more validation errors exist in the task description in the PDDL, the one or more processors are configured to execute the processor-executable instructions and cause the processing system to perform the syntactic validation, without performing the generic constraint validation and the domain constraint validation, and the one or more validation errors are determined when performing the syntactic validation.

12. The processing system of claim 10, wherein:

to determine whether the one or more validation errors exist in the task description in the PDDL, the one or more processors are configured to execute the processor-executable instructions and cause the processing system to perform the syntactic validation and the generic constraint validation, without performing the domain constraint validation, the one or more validation errors are determined when performing the generic constraint validation, and the generic constraint validation is performed after performing the syntactic validation.

13. The processing system of claim 8, wherein the desired goal state requested by the prompt comprises:

a possession of information;

a completion of one or more tasks excluding information retrieval; or a completion of one or more tasks including the information retrieval.

14. The processing system of claim 8, wherein to identify and classify the plurality of tokens in the prompt using the LLM, the one or more processors are configured to execute the processor-executable instructions and cause the processing system to prompt, via a set of prompts, the LLM to perform a series of natural language processing (NLP) tasks.

* * * * *